US012720457B2

(12) United States Patent
He et al.

(10) Patent No.: US 12,720,457 B2
(45) Date of Patent: Aug. 25, 2026

(54) TIME INFORMATION SENDING METHOD, TERMINAL, AND NETWORK-SIDE DEVICE

(71) Applicant: VIVO MOBILE COMMUNICATION CO., LTD., Guangdong (CN)

(72) Inventors: Ranran He, Guangdong (CN); Yanxia Zhang, Guangdong (CN); Yitao Mo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 494 days.

(21) Appl. No.: 18/350,265

(22) Filed: Jul. 11, 2023

(65) Prior Publication Data

US 2023/0354235 A1 Nov. 2, 2023

Related U.S. Application Data

(63) Continuation of application No. PCT/CN2022/072006, filed on Jan. 14, 2022.

(30) Foreign Application Priority Data

Jan. 19, 2021 (CN) ........................ 202110070468.8

(51) Int. Cl.
*H04W 56/00* (2009.01)
*H04W 64/00* (2009.01)

(52) U.S. Cl.
CPC ..... *H04W 56/0045* (2013.01); *H04W 64/003* (2013.01)

(58) Field of Classification Search
CPC ........... H04W 56/0045; H04W 64/003; H04W 56/004; H04W 56/001; H04W 56/0095; H04W 72/1268; H04W 72/21; H04W 72/231; H04W 64/00; H04W 4/029; H04W 4/02; H04W 4/021; H04W 12/63; H04W 76/15; H04W 4/38; H04W 48/18; H04W 24/02; H04W 4/025; H04W 56/0065; H04W 60/04; H04W 72/0453;
(Continued)

(56) References Cited

U.S. PATENT DOCUMENTS 10,554,293 B1 2/2020 Chin et al.
2011/0256865 A1 10/2011 Sayeed et al.
(Continued)

FOREIGN PATENT DOCUMENTS

CN 101646234 A 2/2010
CN 101790188 A 7/2010
(Continued)

OTHER PUBLICATIONS

Mediatek Inc., "Timing Relationship Enhancements for NR-NTN", 3GPP TSG-RAN WG1 Meeting #102e, R1-2005495, Aug. 24-28, 2020.
(Continued)

*Primary Examiner* — Nimesh Patel
(74) *Attorney, Agent, or Firm* — Price Heneveld LLP

(57) ABSTRACT

This application discloses a time information sending method, a terminal, and a network-side device, and pertains to the communication field. The method includes: in a case that a first condition is satisfied, sending first time information to a network side, where the first time information is used for obtaining a timing advance value of the terminal.

19 Claims, 6 Drawing Sheets

(58) Field of Classification Search
CPC . H04W 12/104; H04W 16/18; H04W 84/042; H04W 84/00; H04W 8/245; H04W 72/563; H04W 74/0816; H04B 7/18513; H04B 7/0617; H04B 17/318; H04B 17/27; H04B 7/0626; H04B 7/088; H04B 7/0404; H04B 7/0413; H04B 17/252; H04B 17/254; H04L 5/0048; G01S 5/0236; G01S 5/0036; G01S 19/46; G01S 5/021; G01S 5/0226; G01S 5/0242; G01S 19/42; G01S 19/48; G01S 5/0018; G01S 2013/466; G01S 19/40; G01S 2205/008; G01S 5/02521
See application file for complete search history.

(56) References Cited

U.S. PATENT DOCUMENTS

2012/0282969 A1 11/2012 Jiang et al.
2013/0100938 A1* 4/2013 Kwon ................. H04L 27/2655 370/336
2017/0201958 A1 7/2017 He
2018/0062776 A1* 3/2018 Teshima ................ H04W 56/00
2018/0139747 A1* 5/2018 Hosseini ............... H04W 72/21
2021/0352711 A1 11/2021 Wu
2021/0360556 A1 11/2021 Liu et al.
2022/0086822 A1* 3/2022 Bao ......................... G01S 1/024
2022/0150858 A1 5/2022 Ren et al.

FOREIGN PATENT DOCUMENTS

CN 105493584 A 4/2016
CN 110062455 A 7/2019
CN 111278155 A 6/2020
CN 111526576 A 8/2020
EP 2557867 A1 2/2013
WO 2020126666 A1 6/2020
WO 2020164362 A1 8/2020
WO 2020199190 A1 10/2020

OTHER PUBLICATIONS

OPPO, "Consideration on MAC Enhancement for NTN", 3GPP TSG-RAN WG2 Meeting #111 electronic, R2-2006781, Online, Aug. 17-28, 2020.
ETRI, "Timing Advance Management in NTN", 3GPP TSG-RAN WG2 Meeting #112 electronic, R2-2010091, Online, Nov. 2-13, 2020.
Apple, on Timing Advance for NTN, 3GPP TSG RAN WG1 #102-e, R1-2006520, e-Meeting, Aug. 17-28, 2020.
CATT, Thales, OPPO, Spreadtrum Communications, TP on Random Access procedure, 3GPP TSG RAN WG2 Meeting #108, R2-1914498, Nov. 18-22, 2019, Reno, USA.
OPPO, Discussion on time advance in NTN, 3GPP TSG-RAN WG2 Meeting #108, R2-1915168, Nov. 18-Nov. 22, 2019, Reno, USA.
Fourth Japanese Office Action for Japanese Patent Application No. 2023-543230, dated Nov. 25, 2025, 23 pages.
Moderator (Thales), "FL Summary on enhancements on UL time and frequency synchronization for NR NTN", P3GPP TSG-RAN WG1 Meeting #103-e, R1-2009748, e-Meeting, Oct. 26-Nov. 13, 2020.

* cited by examiner

S201

In a case that a first condition is satisfied, send first time information to a network side, where the first time information is used for obtaining a timing advance value of a terminal

TIME INFORMATION SENDING METHOD, TERMINAL, AND NETWORK-SIDE DEVICE

CROSS-REFERENCE TO RELATED APPLICATIONS

The present invention is a continuation application of PCT International Application No. PCT/CN2022/072006 filed on Jan. 14, 2022, which claims priority to Chinese Patent Application No. 202110070468.8, filed with the China National Intellectual Property Administration on Jan. 19, 2021 and entitled "TIME INFORMATION SENDING METHOD, TERMINAL, AND NETWORK-SIDE DEVICE", which are incorporated herein by reference in their entireties.

TECHNICAL FIELD

This application pertains to the field of communication technologies, and specifically, relates to a time information sending method, a terminal, and a network-side device.

BACKGROUND

There may be a long transmission delay in some communication scenarios, for example, non-terrestrial networks (NTN). The NTN is a network or network segment that uses satellite or an unmanned aircraft system (UAS) platform for transmission. In these communication scenarios, for user equipments (UE), or terminals or terminal devices that have performed delay pre-compensation, a resource position on the network side may have expired when scheduling information is received, and consequently uplink data of the UE cannot be sent on a scheduling resource configured by the network, thereby affecting transmission reliability.

SUMMARY

According to a first aspect, a time information sending method is provided, applied to a terminal, and the method includes:

- in a case that a first condition is satisfied, sending first time information to a network side, where the first time information is used for obtaining a timing advance value of the terminal.

According to a second aspect, a time information sending method is provided, applied to a network-side device, and the method includes:

- receiving first time information sent by a terminal, where the first time information is sent by the terminal in a case that a first condition is satisfied; and
- obtaining, based on the first time information, a timing advance value of the terminal.

According to a third aspect, a time information sending apparatus is provided, including: a judgment module, configured to determine whether a first condition is satisfied; and a transceiver module, configured to: in a case that the first condition is satisfied, send first time information to a network side, where the first time information is used for obtaining a timing advance value of a terminal.

According to a fourth aspect, a time information sending apparatus is provided, including: a transmission module, configured to receive first time information sent by a terminal, where the first time information is sent by the terminal in a case that a first condition is satisfied; and an execution module, configured to obtain, based on the first time information, a timing advance value of the terminal.

According to a fifth aspect, a terminal is provided, where the terminal includes a processor, a memory, and a program or instructions stored in the memory and capable of running on the processor, and when the program or the instructions are executed by the processor, the steps of the method according to the first aspect are implemented.

According to a sixth aspect, a network-side device is provided, where the network-side device includes a processor, a memory, and a program or instructions stored in the memory and capable of running on the processor, and when the program or the instructions are executed by the processor, the steps of the method according to the second aspect are implemented.

According to a seventh aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to an eighth aspect, a chip is provided, where the chip includes a processor and a communications interface, the communications interface is coupled to the processor, and the processor is configured to run a program or instructions of a network-side device to implement the steps of the method according to the first aspect or implement the steps of the method according to the second aspect.

According to a ninth aspect, a program product is provided, where the program product is stored in a storage medium, and the program product is executed by a processor to implement the steps of the method according to the first aspect or implement the steps of the method according to the second aspect.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, in the specification and claims, "and/or" represents presence of at least one of connected objects, and the symbol "/" in this specification usually indicates an "or" relationship between associated objects.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communication system.

Figures 1, 2:
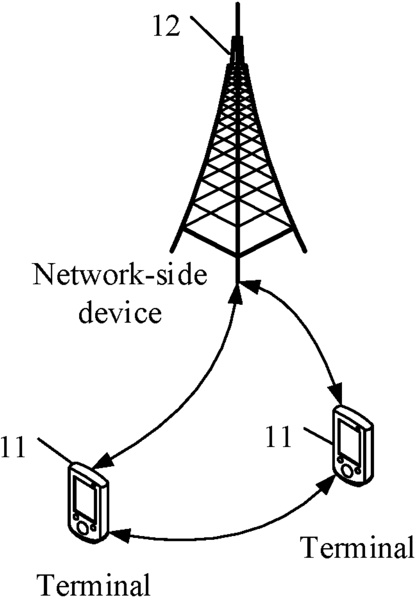
FIG. 1 is a block diagram of a wireless communication system to which the embodiments of this application are applicable.
FIG. 2 is a schematic flowchart of a time information sending method according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (Base Transceiver Station, BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a time information sending method provided in the embodiments of this application by using specific embodiments and application scenarios thereof with reference to the accompanying drawings.

For UE with pre-compensation capability, the UE sends uplink data after using delay compensation. Because the network side does not know exact timing advance (i.e. timing advance value) of the UE, the network side may schedule a next uplink transmission using a resource position that is very close to the received uplink transmission. The resource position on the network side may have expired when the UE receives the scheduling information. As a result, uplink data of the UE cannot arrive through a scheduling resource configured by the network side, affecting transmission reliability.

FIG. 2 is another schematic flowchart of a time information sending method according to an embodiment of this application. This method may be executed by a terminal, in other words, the method may be executed by software or hardware installed in the terminal. As shown in FIG. 2, the method may include the following steps.

Step S201: In a case that a first condition is satisfied, send first time information to a network side, where the first time information is used for obtaining a timing advance value of the terminal.

The terminal sends the first time information to the network side when the preset first condition is satisfied. After receiving the first time information, the network side may determine the timing advance value of the terminal, and may assign uplink scheduling to the terminal based on the timing advance value of the terminal. For example, the Timing Advance (TA) reporting procedure is used in a non-terrestrial network to provide the gNB with the first time information. In some embodiments, the first time information may be an estimate of the UE's Timing Advance value, and the terminal can send the first time information to a network side by triggering a Timing Advance report (TAR).

It should be understood that the network side includes a network-side device accessed by the terminal. For an NTN network, the network side may include a first network-side device such as a base station, and a second network-side device such as a satellite or an unmanned aircraft system. The first network-side device may be the same as the second network-side device. Satellites include low earth orbiting (LEO) satellites, medium earth orbiting (MEO) satellites, geostationary earth orbiting (GEO) satellites, and highly elliptical orbiting (HEO) satellites.

In this way, according to the time information sending method in this embodiment of this application, if the first condition is satisfied, the first time information is sent to the network side, where the first time information is used to enable the network side to obtain the timing advance value of the terminal, so that the network side can assign appropriate uplink scheduling to the UE to avoid expiration of a resource position on the network side, thereby improving transmission reliability.

Figure 3:
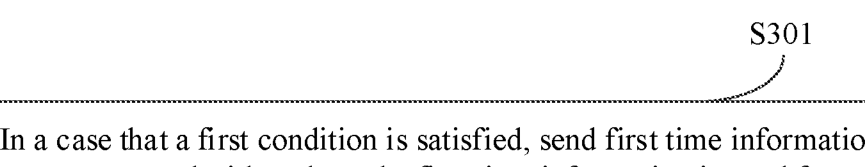
FIG. 3 is another schematic flowchart of a time information sending method according to an embodiment of this application.

FIG. 3 is another schematic flowchart of a time information sending method according to an embodiment of this application. This method may be executed by a terminal, in other words, the method may be executed by software or hardware installed in the terminal. As shown in FIG. 3, the method may include the following steps.

Step S301: In a case that a first condition is satisfied, send first time information to a network side, where the first time information is used for obtaining a timing advance value of the terminal.

The timing advance value is used for assigning uplink scheduling to the terminal. After receiving the first time information, the network side may determine the timing advance value of the terminal, and may assign uplink scheduling to the terminal based on the timing advance value of the terminal.

The first time information includes at least one of the following:

second time information, where the second time information includes a delay of a service link and a delay of a feeder link;

a delay of the service link;

an offset value relative to third time information, where the third time information includes a delay from a first network-side device to a reference point; and an offset value relative to the first time information that is latest sent.

It should be understood that for an NTN, the service link is a link from the terminal to a second network-side device, and the feeder link is a link from the second network-side device to a first network-side device. For the NTN, in a case that the satellite is a base station, the propagation delaydelay of the feeder link is 0. In some embodiments, for the second time information, the uplink frame number for transmission from the terminal shall start $$T_{TA}=\left(N_{TA}+N_{TA,offset}+N_{TA,adj}^{common}+N_{TA,adj}^{UE}\right)T_c$$

before the start of the corresponding downlink frame at the terminal where $N_{TA}$ and $N_{TA,offset}$ are specific by protocol, except for msgA transmission on PUSCH where $N_{TA}=0$ shall be used; and $$N_{TA,adj}^{common}$$

is derived from the higher-layer parameters TACommon, TACommonDrift, and TACommonDriftVariation if configured, otherwise $$N_{TA,adj}^{common}=0;$$

and $$N_{TA,adj}^{UE}$$

is computed by the terminal based on terminal position and serving-satellite-ephemeris-related higher-layers parameters if configured, otherwise $$N_{TA,adj}^{UE}=0.$$

In an implementation, the delay of the service link is determined based on positioning information and first information. The positioning information includes location information of the terminal, and the first information is related to the second network-side device. For example, if the second network-side device is a satellite, the first information is satellite ephemeris information. The terminal can calculate the delay of the service link based on the positioning information and the satellite ephemeris information. For another example, the delay of the service link is corresponding to $$N_{TA,adj}^{UE},$$

which is computed by the terminal based on terminal position and serving-satellite-ephemeris-related higher-layers parameters if configured.

The first time information latest sent is first time information sent last time. The offset value relative to the first time information latest sent may be a positive value, a negative value, or zero, respectively representing a relative relationship between the first time information sent this time and the first time information that is latest sent. For example, the offset value being a positive value means that the first time information sent this time is behind the first time information latest sent; the offset value being a negative value means that the first time information sent this time is ahead of the first time information latest sent; and the offset value being 0 means that the first time information sent this time is the same as the first time information that is latest sent. Alternatively, the offset value being a positive value means that the first time information sent this time is ahead of the first time information latest sent; the offset value being a negative value means that the first time information sent this time is behind the first time information latest sent; and the offset value being 0 means that the first time information sent this time is the same as the first time information that is latest sent.

The first condition includes at least one of the following: period-based sending condition, request-based sending condition, and event-triggered sending condition.

In an implementation, the first condition may include a period-based sending condition. The period-based sending condition may be configured by the network side or specified by a protocol. The period-based sending condition may be expiration of a first timer related to sending of the first time information, and the first timer may be set based on a protocol-specified period or based on network-side configuration. For example, when the first condition includes expiration of the first timer related to sending of the first time information, the UE sends the first time information and restarts the first timer.

In another implementation, the first condition may include a request-based sending condition. The request-based sending condition may be reception of an indication of sending the first time information, where the indication is used to indicate the UE to send the first time information. For example, the UE sends the first time information if the first condition includes reception of an indication of sending the first time information, and the UE does not send the first time information if receiving no indication of sending the first time information.

The related indication of sending the first time information includes at least one of the following: a scheduling signaling indication and a radio resource control (RRC) signaling indication.

For the scheduling signaling indication, such as downlink control information (DCI), the request-based sending condition may be that the UE sends the first time information if the UE receives scheduling signaling that indicates sending of the first time information. In an implementation, the scheduling signaling including a related indication of sending the first time information may be represented by one bit, whose value may be 0 or 1. The value being 1 indicates sending the first time information; and the value being 0 indicates not sending the first time information, that is, the UE sends the first time information when receiving the scheduling signaling indicating 1. Alternatively, the value being 0 indicates sending the first time information; and the value being 1 indicates not sending the first time information, that is, the UE sends the first time information when receiving the scheduling signaling indicating 0.

For the RRC signaling, different types of RRC messages may be used, for example, RRC reconfiguration message or other RRC messages. In an implementation, the RRC signaling may include an information element (IE) related to sending of the first time information, and the value may be true. The value being true indicates sending the first time information. If there is no IE, it indicates not sending the first time information. The request-based sending condition may be that the UE has received an RRC message, where the RRC message includes an IE related to sending of the first time information, and the value of this IE is true. Then the UE sends the first time information.

In another implementation, the first condition may include a period-based and request-based sending condition. When the first timer related to sending of the first time information expires and the UE receives an indication of sending the first time information, the UE sends the first time information. The first timer may be specified by the protocol or configured by the network side. The indication of sending the first time information may be a scheduling signaling indication, and the indication is used to indicate whether to send the first time information. In an implementation, this indication may be represented by one bit, whose value may be 0 or 1. The value being 1 indicates sending the first time information; and the value being 0 indicates not sending the first time information. Alternatively, the value being 0 indicates sending the first time information; and the value being 1 indicates not sending the first time information. For example, when the first condition includes expiration of the first timer related to sending of the first time information and scheduling signaling indicating sending of the first time information is received, the UE sends the first time information and restarts the first timer. When the first timer related to sending of the first time information expires and the scheduling signaling indicating not sending the first time information, the UE does not send the first time information.

In another implementation, the first condition may include an event-triggered sending condition, and the event-triggered sending condition includes at least one of the following:

initial access being executed, for example, random access signaling msg3 or msgA being received;

connection being resumed;

an offset value (offset) between a time in the first time information sent and a time in the first time information latest sent equaling or exceeding a first threshold (delta), where the first threshold may be specified by the protocol or configured by the network side, for example, when the first condition include the offset being less than the delta, the UE does not send the first time information, and when the offset is greater than or equal to the delta, the UE sends the first time information;

uplink out-of-synchronization being determined;

cell handover having occurred;

a reference signal received power (RSRP) being less than a second threshold, where the second threshold may be specified by the protocol or configured by the network side;

a reference signal received quality (RSRQ) being less than a third threshold, where the third threshold may be specified by the protocol or configured by the network side;

a path loss value being greater than a fourth threshold, where the fourth threshold may be specified by the protocol or configured by the network side;

an offset value between the reference signal received power and a latest measured reference signal received power being greater than a fifth threshold, where the fifth threshold may be specified by the protocol or configured by the network side;

an offset value between the reference signal received quality and a latest measured reference signal received quality being greater than a sixth threshold, where the sixth threshold may be specified by the protocol or configured by the network side; and the path loss value and a latest measured path loss value being greater than a seventh threshold, where the seventh threshold may be specified by the protocol or configured by the network side.

Content and a format of the first time information may be specified by the protocol or configured by the network side. The format of the first time information may include a unit of the first time information and a quantized value length of the first time information.

For example, in a case that the first condition includes an event-triggered sending condition, a Timing Advance report (TAR) may be triggered if any of the following events occur:

if ta-Report is configured with value enabled, upon initiation of Random Access procedure due to initial access from RRC_IDLE, RRC Connection Resume procedure from RRC_INACTIVE, or RRC Connection Re-establishment procedure;

if ta-Report with value enabled is indicated in the handover command, upon initiation of Random Access procedure due to reconfiguration with sync;

upon configuration or reconfiguration of offsetThresholdTA by upper layers, if the terminal has not previously reported Timing Advance value to current Serving Cell;

if the variation between current information about Timing Advance and the last successfully reported information about Timing Advance is equal to or larger than offsetThresholdTA, if configured.

The unit of the first time information may be specified by the protocol or configured by the network side, and the unit of the first time information includes at least one of the following: the number of frames, the number of slots, the number of symbols, the number of sample points, seconds, milliseconds, and microseconds.

The quantized value length of the first time information may be specified by the protocol or configured by the network side, and the quantized value length of the first time information is determined based on at least one of the following:

content of the first time information; and type of the second network-side device, which is, for the NTN, a type of satellite accessed by the terminal; and unit of the first time information.

For example, if the content of the first time information sent is the delay of the service link and feeder link, the type of the satellite accessed is GEO, and the unit of the first time information is milliseconds, a maximum delay of the service link and feeder link is 541.46 ms and the quantized value length of the first time information may be represented by 10 bits. In some embodiments, the quantized value length of the first time information is specified by the protocol, and The Timing Advance Report MAC CE is identified by MAC subheader with LCID. It has a fixed size and consists of two octets defined as follows:

Timing Advance: In FR1, the Timing Advance field (i.e. the first time information) indicates the least integer number of slots greater than or equal to the Timing Advance value. The length of the field is 14 bits.

In an implementation, the sending first time information to a network side includes: generating a media access control control element MAC CE (for example, a Timing Advance Report MAC CE, TAR MAC CE, which is identified by MAC subheader with LCID) through a media access control layer, and sending the MAC CE to the network side, where the MAC CE carries the first time information, so that the network side obtains the timing advance value of the terminal based on the first time information.

The MAC CE may be preset to carry the first time information of the UE. In the MAC CE, a reserved index value is used as a locale ID (LCID), where the locale ID is used to indicate that the media access control control element carries the first time information. That is, the MAC CE is identified by a MAC subheader with the LCID. The reserved index value (index) may use one index value in index=33-44 as an LCID to define that this MAC CE is for sending the first time information of the UE, or may use one index value in index=64-308 as an eLCID to define that this MAC CE is for sending the first time information of the UE.

The format and size of the MAC CE may be specified in the protocol or configured by the network side based on at least one of the following: content of the first time information, type of a second network-side device, and unit of the first time information. A specific example is as follows: in a case that the type of the second network-side device satellite is GEO, the common delay of the service link and feeder link is 541.46 ms, and if the unit of the first time information sent is frame, a maximum value for sending is 55 frames, which can be represented by six bits. However, if the unit of the first time information sent is ms, it can be represented by 10 bits. In order to implement a smaller granularity, different bits may be used to represent different time units. For example, a first field represents milliseconds and is represented by 10 bits, and a second field represents microseconds and is represented by 10 bits.

The MAC CE uses a grant configured by the network. The grant may be configured grant, dynamic grant, or the like. The grant configured by the network side may be a grant dedicated to the MAC CE, or may use a recently available grant, for example, a grant for transmitting Msg3/MsgA/Msg5 during a random access procedure.

A priority of the media access control control element satisfies at least one of the following:

being lower than a priority of a media access control control element carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a media access control control element carrying configured grant acknowledgement;

being higher than a priority of a media access control control element carrying a BFR; and being higher than a priority of a media access control control element carrying multi-access configured grant acknowledgement.

In another implementation, the sending first time information to a network side includes: generating a radio resource control (RRC) message through a radio resource control layer, and sending the radio resource control message to the network side, where the radio resource control message carries the first time information, so that the network side obtains the timing advance value of the terminal based on the first time information.

The first time information may be sent in the RRC procedure, which may be an ordinary RRC procedure, such as a connection establishment procedure, a connection recovery procedure, a reconfiguration procedure, a reestablishment procedure, and an assistance information procedure.

There may be a plurality of types of RRC messages, which may be a common RRC message, for example, an RRC establishment request message or an RRC recovery request message for non-connected-state UE, and an RRC reconfiguration complete message, an RRC reestablishment request message, UE assistance information, or the like for connected-state UE. A field for carrying the first time information is added to the RRC message. The RRC message may alternatively be a dedicated RRC message for carrying the first time information.

The RRC message uses a grant configured by the network side. The grant may be configured grant, dynamic grant, or the like. The grant configured by the network may be a grant dedicated to the RRC message or uses a recently available grant.

In another implementation, the sending first time information to a network side includes: generating uplink control signaling through a physical layer, and sending the uplink control signaling to the network side, where the uplink control signaling carries the first time information.

In this way, according to the time information sending method in this embodiment of this application, if the first condition is satisfied, the first time information is sent to the network side, where the first time information is used for obtaining the timing advance value of the terminal, so that the network side can assign appropriate uplink scheduling to the UE based on the timing advance value of the terminal to avoid expiration of a resource position on the network side, thereby improving transmission reliability.

Figure 4:
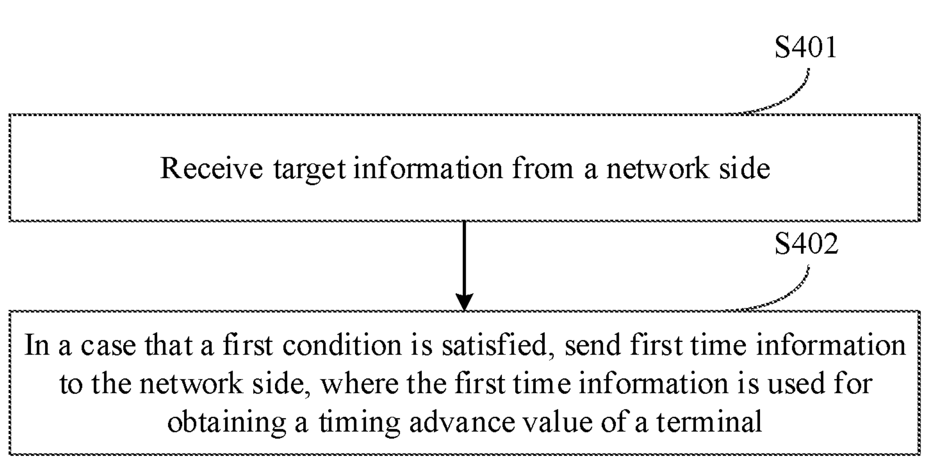
FIG. 4 is another schematic flowchart of a time information sending method according to an embodiment of this application.

FIG. 4 is another schematic flowchart of a time information sending method according to an embodiment of this application. This method may be executed by a terminal, in other words, the method may be executed by software or hardware installed in the terminal. As shown in FIG. 4, the method includes the following execution steps.

Step S401: Receive target information from a network side.

The target information includes at least one of the following:

first information, where the first information is related to a second network-side device, for example, if the second network-side device is a satellite, the first information is satellite ephemeris information, and the terminal can calculate a delay of a service link based on positioning information and the satellite ephemeris information;

a delay of a feeder link, for the NTN, the feeder link is a link from the second network-side device to a first network-side device, for example, a link from a satellite to a ground base station;

third time information, where the third time information includes a delay from the first network-side device to a reference point and the delay may be determined by selecting a reference point; for example, for the NTN, the third time information is a delay from the satellite to the reference point, and the reference point may be located in a link between the first network-side device and the terminal, for example, in a cell or beam center or on the second network-side device (such as a satellite);

content of first time information;

format of the first time information;

period information, used for the terminal periodically to the first time information to the network side based on the period information, for example, the period information is information related to a first timer, including a start time and period length of the first timer, and the first timer is related to periodical sending of the first time information to the network side, and may be used for configuring a period-based sending condition in the first condition;

a first indication, where the first indication is related to sending of the first time information to the network side based on a request, so that the terminal may send the first time information to the network side based on the first indication, and the UE sends the first time information after receiving the first indication; and a first event, where the first event is related to sending of the first time information to the network side based on the event, and is used for triggering or configuring an event-triggered sending condition in the first condition, so that the terminal can send the first time information to the network side based on the first event.

The first indication includes: a scheduling signaling indication and/or a radio resource control signaling indication (for example, a SIB). In some embodiments, the first indication may be a TA report, which is used to indicates whether terminal specific TA reporting is enabled during initial access.

Step S402: In a case that a first condition is satisfied, send first time information to the network side, where the first time information is used for obtaining a timing advance value of the terminal and/or for assigning uplink scheduling to the terminal.

The method executed in step S402 is basically the same as that in step S301 in FIG. 3, with the same or similar beneficial effects achieved. For brevity, details are not repeated herein.

In this way, according to the time information sending method provided in this embodiment of this application, the UE receives the target information from the network side, so as to upload, the first time information according to flexible configuration of the network side when the first condition is satisfied. Then, the network side can assign appropriate uplink scheduling to the UE to avoid expiration of a resource position on the network side, thereby improving transmission reliability.

Figure 5:
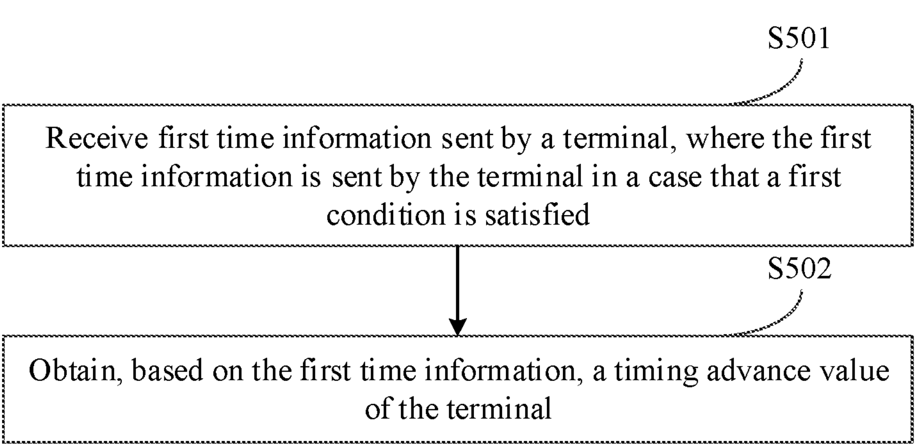
FIG. 5 is another schematic flowchart of a time information sending method according to an embodiment of this application.

FIG. 5 is another schematic flowchart of a time information sending method according to an embodiment of this application. The method may be executed by a network side. For example, in an NTN, the network side may be a base station or a satellite. As shown in FIG. 5, the method may include the following steps.

Step S501: Receive first time information sent by a terminal, where the first time information is sent by the terminal in a case that a first condition is satisfied.

Step S502: Obtain, based on the first time information, a timing advance value of the terminal.

The method executed in the steps S501 and S502 is the same or similar to the step S201 in FIG. 2, with basically the same or similar beneficial effects achieved, and details are not repeated herein.

Therefore, according to the time information sending method provided in this embodiment of this application, the first time information sent by the terminal is received, where the first time information is sent by the terminal when the first condition is satisfied; and the timing advance value of the terminal is obtained based on the first time information. In this way, the network side can assign appropriate uplink scheduling to the UE to avoid expiration of a resource position on the network side, thereby improving transmission reliability.

Figure 6:
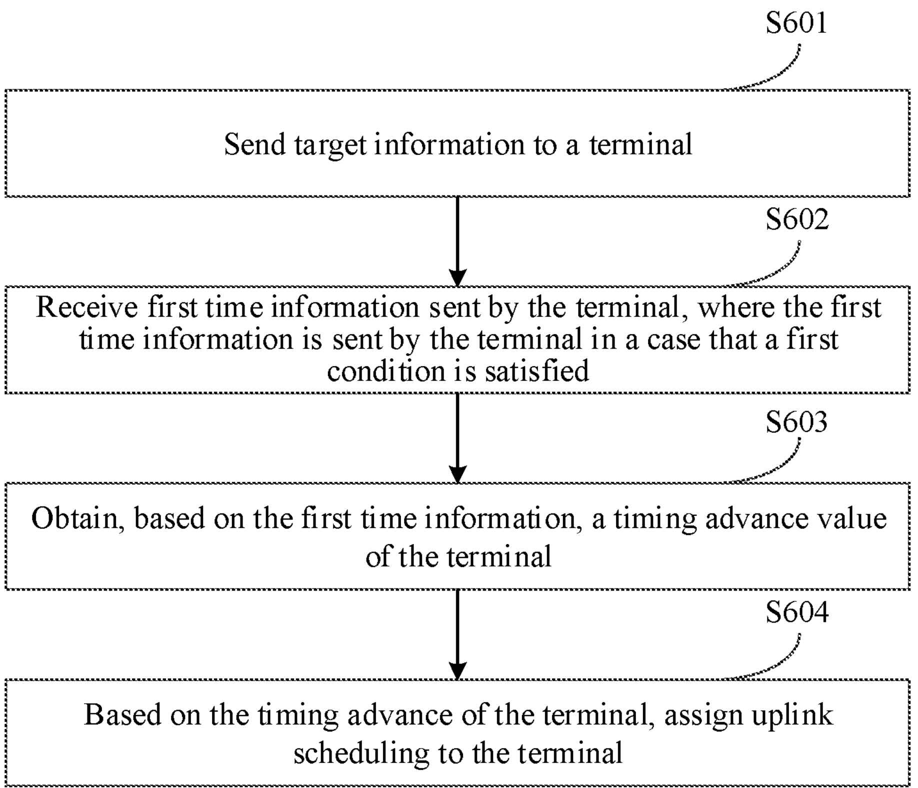
FIG. 6 is another schematic flowchart of a time information sending method according to an embodiment of this application.

FIG. 6 is another schematic flowchart of a time information sending method according to an embodiment of this application. The method can be executed by a network side, and the network side may be a first network-side device or a second network-side device. The first network-side device may be the same as the second network-side device. For example, in an NTN, the first network-side device is a base station, and the second network-side device is a satellite, where the satellite may be a base station. As shown in FIG. 6, the method may include the following steps.

Step S601: Send target information to a terminal.

The target information includes at least one of the following:

first information, where the first information is related to the second network-side device;

a delay of a feeder link;

third time information, where the third time information includes a delay from the first network-side device to a reference point;

content of first time information;

format of the first time information;

period information, used for the terminal periodically to send the first time information to the network side based on the period information;

a first indication, used for the terminal periodically to send the first time information to the network side based on the first indication; and a first event, used for the terminal periodically to send the first time information to the network side based on the first event.

Step S602: Receive first time information sent by the terminal, where the first time information is sent by the terminal in a case that a first condition is satisfied.

Step S603: Obtain, based on the first time information, a timing advance value of the terminal.

The method executed in the steps S602 and S603 is the same or similar to the step S301 in FIG. 3, with basically the same or similar beneficial effects achieved, and details are not repeated herein.

The first time information includes at least one of the following:

second time information, where the second time information includes a delay of a service link and a delay of a feeder link;

a delay of the service link;

an offset value relative to third time information, where the third time information includes a delay from the first network-side device to a reference point; and an offset value relative to the first time information that is latest sent.

The first condition includes at least one of the following:

period-based sending condition, request-based sending condition, and event-triggered sending condition.

The event-triggered sending condition includes at least one of the following:

initial access being executed;

connection being resumed;

an offset value between a time in the first time information sent and a time in the first time information latest sent equaling or exceeding a first threshold;

uplink out-of-synchronization being determined;

cell handover having occurred;

a reference signal received power being less than a second threshold;

a reference signal received quality being less than a third threshold; and a path loss value being greater than a fourth threshold.

A format of the first time information includes a unit of the first time information, and the unit of the first time information includes at least one of the following: the number of frames, the number of slots, the number of symbols, the number of sample points, seconds, milliseconds, and microseconds.

The format of the first time information includes a quantized value length of the first time information, and the quantized value length is specified by a protocol or configured by the network side.

The quantized value length of the first time information is determined based on at least one of the following:

content of the first time information;

type of the second network-side device; and unit of the first time information.

The receiving first time information sent by a terminal includes at least one of the following:

receiving a media access control control element MAC CE sent by the terminal, where the MAC CE carries the first time information;

receiving a radio resource control message sent by the terminal, where the radio resource control message carries the first time information; and receiving uplink control signaling sent by the terminal, where the uplink control signaling carries the first time information.

A format and size of the media access control control element, the radio resource control message, and the uplink control signaling are determined by at least one of the following: content of the first time information;

type of the second network-side device; and unit of the first time information.

A priority of the media access control control element satisfies at least one of the following:

being lower than a priority of a media access control control element carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a media access control control element carrying configured grant acknowledgement;

being higher than a priority of a media access control control element carrying a BFR; and being higher than a priority of a media access control control element carrying multi-access configured grant acknowledgement.

In an implementation, the step S602 includes: determining the timing advance value of the terminal based on the first time information and/or fourth time information, where the fourth time information includes a time offset for an uplink signal of the terminal.

It should be understood that the fourth time information is obtained through measurement due to inaccuracy of time information calculated by the UE. For example, the network side expects an uplink signal of the UE to arrive at system frame 1 (System frame number1, SFN1); however, after pre-compensation, the uplink signal sent by the UE arrives at SFN3, and in a case that the network side cannot know pre-compensation of the UE, the fourth time information obtained through measurement is two SFNs. There may be a case that the fourth time information cannot be obtained by the network side.

In an implementation, in a case that the first time information is second time information, the timing advance value of the terminal is the first time information, where the second time information includes a delay of a service link and a delay of a feeder link.

In another implementation, in a case that the first time information is a delay of the service link, the timing advance value of the terminal is a sum of the first time information and the delay of the feeder link.

In another implementation, in a case that the first time information is an offset value relative to third time information, the timing advance value of the terminal is a sum of the first time information and the third time information, where the third time information includes a delay from the first network-side device to a reference point.

In another implementation, in a case that the first time information is an offset value relative to the first time information that is latest sent, the timing advance value of the terminal is a sum of the first time information and the first time information that is latest sent.

In a case that the network side receives the first time information and obtains the fourth time information:

in an implementation, in a case that the first time information is second time information, the timing advance value of the terminal is a sum of the first time information and fourth time information;

in another implementation, in a case that the first time information is a delay of the service link, the timing advance value of the terminal is a sum of the first time information, the delay of the feeder link, and the fourth time information;

in another implementation, in a case that the first time information is an offset value relative to third time information, the timing advance value of the terminal is a sum of the first time information, the third time information, and the fourth time information; and in another implementation, in a case that the first time information is an offset value relative to latest sent time information, the timing advance value of the terminal is a sum of the first time information, latest sent time information, and the fourth time information.

In an implementation, after the obtaining the timing advance value of the terminal based on the first time information and/or fourth time information, the method further includes:

indicating the timing advance value of the terminal and/or the fourth time information to the terminal.

Step S604: Based on the timing advance value of the terminal, assign uplink scheduling (UL grant) to the terminal.

Therefore, according to the time information sending method provided in this embodiment of this application, the target information is sent to the terminal; and based on the received first time information and/or fourth time information, the timing advance value of the terminal is obtained. In this way, the obtained timing advance value of the terminal is more accurate. Appropriate uplink scheduling is assigned to avoid expiration of a resource position on the network side, thereby improving transmission reliability.

It should be noted that, in the time information sending method provided by the embodiments of this application, the execution body may be a time information sending apparatus, or a control module for executing the time information sending method in the time information sending apparatus. In this embodiment of this application, the time information sending apparatus provided in the embodiments of this application is described by using the time information sending method being executed by the terminal as an example.

Figure 7:
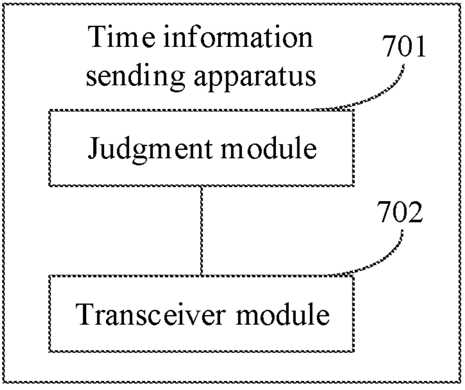
FIG. 7 is a schematic structural diagram of a time information sending apparatus according to an embodiment of this application.

FIG. 7 is a schematic structural diagram of a time information sending apparatus according to an embodiment of this application. As shown in FIG. 7, the time information sending apparatus includes: a judgment module 701 and a transceiver module 702.

The judgment module 701 is configured to determine whether a first condition is satisfied; and the transceiver module 702 is configured to: in a case that the first condition is satisfied, send first time information to a network side, where the first time information is used for obtaining a timing advance value of a terminal.

In this way, in this embodiment of this application, if the first condition is satisfied, the first time information is sent to the network side, where the first time information is used to enable the network side to obtain the timing advance value of the terminal, so that the network side can assign appropriate uplink scheduling to the UE to avoid expiration of a resource position on the network side, thereby improving transmission reliability.

Further, the timing advance value is used for assigning uplink scheduling to the terminal.

Further, the first time information includes at least one of the following:

second time information, where the second time information includes a delay of a service link and a delay of a feeder link;

a delay of the service link;

an offset value relative to third time information, where the third time information includes a delay from a first network-side device to a reference point; and an offset value relative to the first time information that is latest sent.

Further, the delay of the service link is determined based on positioning information and first information, where the positioning information includes location information of the terminal, and the first information is related to a second network-side device.

Further, the first condition includes at least one of the following:

period-based sending condition, request-based sending condition, and event-triggered sending condition.

Further, the event-triggered sending condition includes at least one of the following:

initial access being executed;

connection being resumed;

an offset value between a time in the first time information sent and a time in the first time information latest sent equaling or exceeding a first threshold;

uplink out-of-synchronization being determined;

cell handover having occurred;

a reference signal received power being less than a second threshold;

a reference signal received quality being less than a third threshold; and a path loss value being greater than a fourth threshold.

Further, a format of the first time information includes a unit of the first time information, and the unit of the first time information includes at least one of the following: the number of frames, the number of slots, the number of symbols, the number of sample points, seconds, milliseconds, and microseconds.

Further, a format of the first time information includes a quantized value length of the first time information, and the quantized value length is specified by a protocol or configured by the network side; and The quantized value length of the first time information is determined based on at least one of the following:

content of the first time information;

type of a second network-side device; and unit of the first time information.

Further, the transceiver module is configured to execute at least one of the following:

generating a media access control control element MAC CE through a media access control layer, and sending the MAC CE to the network side, where the MAC CE carries the first time information;

generating a radio resource control message through a radio resource control layer, and sending the radio resource control message to the network side, where the radio resource control message carries the first time information; and generating uplink control signaling through a physical layer, and sending the uplink control signaling to the network side, where the uplink control signaling carries the first time information.

Further, a reserved index value is used as a locale ID in the MAC CE, where the locale ID is used to indicate that the media access control control element carries the first time information.

Further, a format and size of the media access control control element, the radio resource control message, and the uplink control signaling are determined by at least one of the following:

content of the first time information;

type of a second network-side device; and unit of the first time information.

Further, a priority of the media access control control element satisfies at least one of the following:

being lower than a priority of a media access control control element carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a media access control control element carrying configured grant acknowledgement;

being higher than a priority of a media access control control element carrying a BFR; and being higher than a priority of a media access control control element carrying multi-access configured grant acknowledgement.

In this way, in this embodiment of this application, if the first condition is satisfied, the first time information is sent to the network side, where the first time information is used for obtaining the timing advance value of the terminal and/or assigning an uplink scheduling method for the terminal, so that the network side can assign appropriate uplink scheduling to the UE to avoid expiration of a resource position on the network side, thereby improving transmission reliability.

Based on the foregoing embodiments, further, the transceiver module is further configured to receive target information from the network side.

The target information includes at least one of the following:

first information, where the first information is related to a second network-side device;

a delay of a feeder link;

third time information, where the third time information includes a delay from a first network-side device to a reference point;

content of the first time information;

format of the first time information;

period information, used for the terminal periodically to send the first time information to the network side based on the period information;

a first indication, used for the terminal to send the first time information to the network side based on the first indication; and a first event, used for the terminal to send the first time information to the network side based on the first event.

Further, the first indication includes: a scheduling signaling indication and/or a radio resource control signaling indication.

In this way, according to the time information sending method provided in this embodiment of this application, the UE receives the target information from the network side, so as to upload, according to flexible configuration of the network side, the first time information when the first condition is satisfied. Appropriate uplink scheduling is assigned for the UE to avoid expiration of a resource position on the network side, thereby improving transmission reliability.

Figure 8:
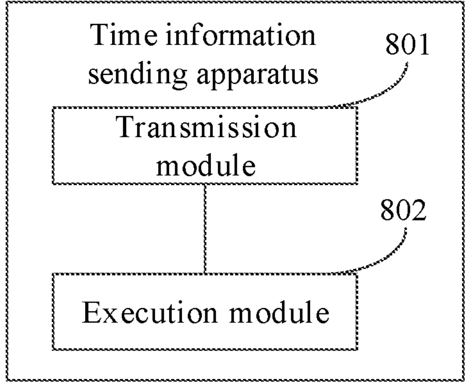
FIG. 8 is a schematic structural diagram of another time information sending apparatus according to an embodiment of this application.

FIG. 8 is a schematic structural diagram of another time information sending apparatus according to an embodiment of this application. As shown in FIG. 8, the time information sending apparatus includes: a transmission module 801 and an execution module 802.

The transmission module 801 is configured to receive first time information sent by a terminal, where the first time information is sent by the terminal in a case that a first condition is satisfied; and the execution module 802 is configured to obtain, based on the first time information, a timing advance value of the terminal.

Therefore, according to the time information sending method provided in this embodiment of this application, the first time information sent by the terminal is received, where the first time information is sent by the terminal when the first condition is satisfied; and the timing advance value of the terminal is obtained based on the first time information to avoid expiration of a resource position on the network side, thereby improving transmission reliability.

Further, the execution module is further configured to assign uplink scheduling to the terminal based on the timing advance value of the terminal.

Further, the first time information includes at least one of the following:

second time information, where the second time information includes a delay of a service link and a delay of a feeder link;

a delay of the service link;

an offset value relative to third time information, where the third time information includes a delay from a first network-side device to a reference point; and an offset value relative to the first time information that is latest sent.

Further, the first condition includes at least one of the following:

period-based sending condition, request-based sending condition, and event-triggered sending condition.

Further, the event-triggered sending condition includes at least one of the following:

initial access being executed;

connection being resumed;

an offset value between a time in the first time information sent and a time in the first time information latest sent equaling or exceeding a first threshold;

uplink out-of-synchronization being determined;

cell handover having occurred;

a reference signal received power being less than a second threshold;

a reference signal received quality being less than a third threshold;

a path loss value being greater than a fourth threshold;

an offset value between the reference signal received power and a latest measured reference signal received power being greater than a fifth threshold;

an offset value between the reference signal received quality and a latest measured reference signal received quality being greater than a sixth threshold; and the path loss value and a latest measured path loss value being greater than a seventh threshold.

Further, a format of the first time information includes a unit of the first time information, and the unit of the first time information includes at least one of the following: the number of frames, the number of slots, the number of symbols, the number of sample points, seconds, milliseconds, and microseconds.

Further, a format of the first time information includes a quantized value length of the first time information, and the quantized value length is specified by a protocol or configured by the network side; and the quantized value length of the first time information is determined based on at least one of the following:

content of the first time information;

type of a second network-side device; and unit of the first time information.

Further, the transmission module is further configured to send target information to the terminal.

The target information includes at least one of the following:

first information, where the first information is related to a second network-side device;

a delay of a feeder link;

third time information, where the third time information includes a delay from a first network-side device to a reference point;

content of the first time information;

format of the first time information;

period information, used for the terminal periodically to send the first time information to the network side based on the period information;

a first indication, used for the terminal to send the first time information to the network side based on the first indication; and a first event, used for the terminal to send the first time information to the network side based on the first event.

Further, the transmission module is configured to execute at least one of the following:

receiving a media access control control element MAC CE sent by the terminal, where the MAC CE carries the first time information;

receiving a radio resource control message sent by the terminal, where the radio resource control message carries the first time information; and receiving uplink control signaling sent by the terminal, where the uplink control signaling carries the first time information.

Further, a format and size of the media access control control element, the radio resource control message, and the uplink control signaling are determined by at least one of the following:

content of the first time information;

type of a second network-side device; and unit of the first time information.

Further, a priority of the media access control control element satisfies at least one of the following:

being lower than a priority of a media access control control element carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a media access control control element carrying configured grant acknowledgement;

being higher than a priority of a media access control control element carrying a BFR; and being higher than a priority of a media access control control element carrying multi-access configured grant acknowledgement.

Further, the execution module is configured to: obtain the timing advance value of the terminal based on the first time information and/or fourth time information, where the fourth time information includes a time offset for an uplink signal of the terminal.

Further, the execution module is configured to execute at least one of the following:

in a case that the first time information is second time information, the timing advance value of the terminal is the first time information, where the second time information includes a delay of a service link and a delay of a feeder link;

in a case that the first time information is a delay of the service link, the timing advance value of the terminal is a sum of the first time information and the delay of the feeder link;

in a case that the first time information is an offset value relative to third time information, the timing advance value of the terminal is a sum of the first time information and the third time information, where the third time information includes a delay from a first network-side device to a reference point;

in a case that the first time information is an offset value relative to latest sent first time information, the timing advance value of the terminal is a sum of the first time information and the first time information latest sent;

in a case that the first time information is second time information, the timing advance value of the terminal is a sum of the first time information and fourth time information;

in a case that the first time information is a delay of the service link, the timing advance value of the terminal is a sum of the first time information, the delay of the feeder link, and the fourth time information;

in a case that the first time information is an offset value relative to third time information, the timing advance value of the terminal is a sum of the first time information, the third time information, and the fourth time information; and in a case that the first time information is an offset value relative to latest sent time information, the timing advance value of the terminal is a sum of the first time information, latest sent time information, and the fourth time information.

Further, the transmission module is further configured to indicate the timing advance value of the terminal and/or the fourth time information to the terminal.

Therefore, according to the time information sending method provided in this embodiment of this application, the target information is sent to the terminal; and based on the received first time information and/or fourth time information, the timing advance value of the terminal is obtained. In this way, the obtained timing advance value of the terminal is more accurate. Appropriate uplink scheduling is assigned to avoid expiration of a resource position on the network side, thereby improving transmission reliability.

The time information sending apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The time information sending apparatus in this embodiment of this application may be an apparatus with an operating system. The operating system may be an Android operating system, an iOS operating system, or other possible operating systems, and is not specifically limited in the embodiments of this application.

The time information sending apparatus provided in this embodiment of this application is capable of implementing the processes implemented in the method embodiments in FIG. 2 to FIG. 4 or the processes implemented in the method embodiments in FIG. 5 and FIG. 6, with the same technical effects achieved. To avoid repetition, details are not described herein again.

Figure 9:
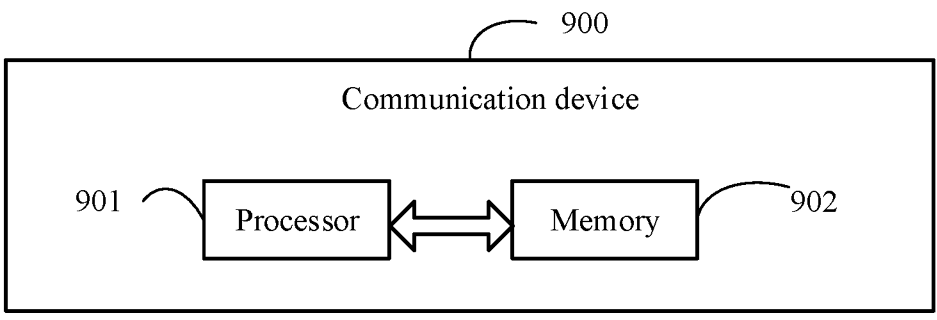
FIG. 9 is a schematic structural diagram of a communication device according to an embodiment of this application.

Optionally, as shown in FIG. 9, an embodiment of this application further provides a communication device 900, including a processor 901, a memory 902, and a program or instructions stored in the memory 902 and capable of running on the processor 901. For example, when the communication device 900 is a terminal and when the program or the instructions are executed by the processor 901, the processes of the foregoing embodiment of the time information sending method are implemented, with the same technical effects achieved. When the communication device 900 is a network-side device and the program or the instructions are executed by the processor 901, the processes of the foregoing embodiment of the time information sending method are implemented, with the same technical effects achieved. To avoid repetition, details are not described herein again.

Figure 10:
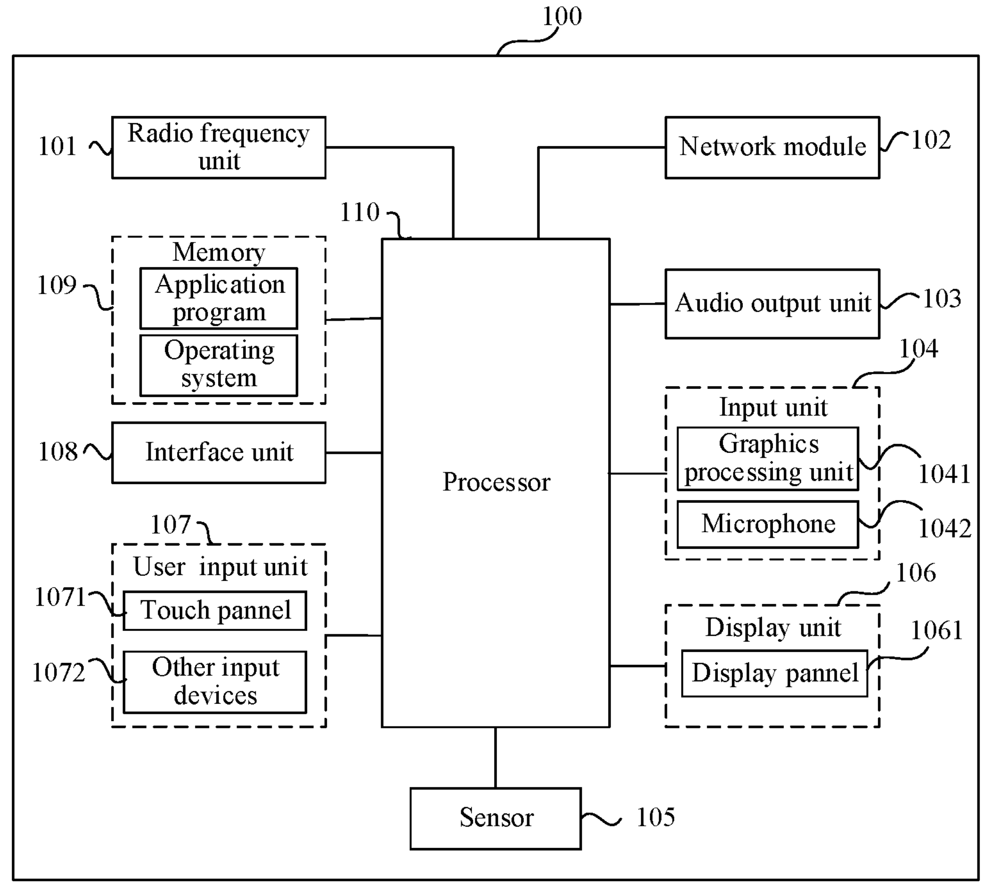
FIG. 10 is a schematic diagram of a hardware structure of a terminal for implementing the embodiments of this application.

FIG. 10 is a schematic diagram of a hardware structure of a terminal for implementing the embodiments of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the terminal 100 may further include a power supply (for example, a battery) supplying power to the components, and the power supply may be logically connected to the processor 110 through a power management system. In this way, functions such as charge management, discharge management, and power consumption management are implemented by using the power management system. The structure of the terminal shown in FIG. 10 does not constitute any limitation on the terminal. The terminal may include more or fewer components than shown in the figure, or a combination of some components, or the components disposed differently. Details are not described herein again.

It can be understood that in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, and the like. The user input unit 107 may include a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a power on/off key), a trackball, a mouse, a joystick, and the like. Details are not described herein.

In this embodiment of this application, the radio frequency unit 101 receives downlink data from a network-side device, and then sends the downlink data to the processor 110 for processing; and also sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may include a program or instruction storage area and a data storage area. The program or instruction storage area may store an operating system, an application program or instruction required by at least one function (for example, a sound playback function or an image playback function), and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 110 may include one or more processing units. Optionally, an application processor and a modem processor may be integrated in the processor 110. The application processor primarily processes an operating system, user interfaces, application programs or instructions, and the like. The modem processor primarily processes radio communication, for example, being a baseband processor. It can be understood that the modem processor may alternatively be not integrated in the processor 110.

The processor 110 is configured to determine whether a first condition is satisfied.

The radio frequency unit 101 is configured to: in a case that the first condition is satisfied, send first time information to a network side, where the first time information is used for obtaining a timing advance value of a terminal.

In this way, in this embodiment of this application, if the first condition is satisfied, the first time information is sent to the network side, where the first time information is used to enable the network side to obtain the timing advance value of the terminal, so that the network side can assign appropriate uplink scheduling to the UE to avoid expiration of a resource position on the network side, thereby improving transmission reliability.

Optionally, the radio frequency unit 101 is further configured to: receive target information from the network side.

Optionally, the radio frequency unit 101 is further configured to execute at least one of the following:

generating a media access control control element MAC CE through a media access control layer, and sending the MAC CE to the network side, where the MAC CE carries the first time information;

generating a radio resource control message through a radio resource control layer, and sending the radio resource control message to the network side, where the radio resource control message carries the first time information; and generating uplink control signaling through a physical layer, and sending the uplink control signaling to the network side, where the uplink control signaling carries the first time information.

In this way, according to the time information sending method provided in this embodiment of this application, the UE receives the target information from the network side, so as to upload, according to flexible configuration of the network side, the first time information when the first condition is satisfied. Appropriate uplink scheduling is assigned for the UE to avoid expiration of a resource position on the network side, thereby improving transmission reliability.

Figure 11:
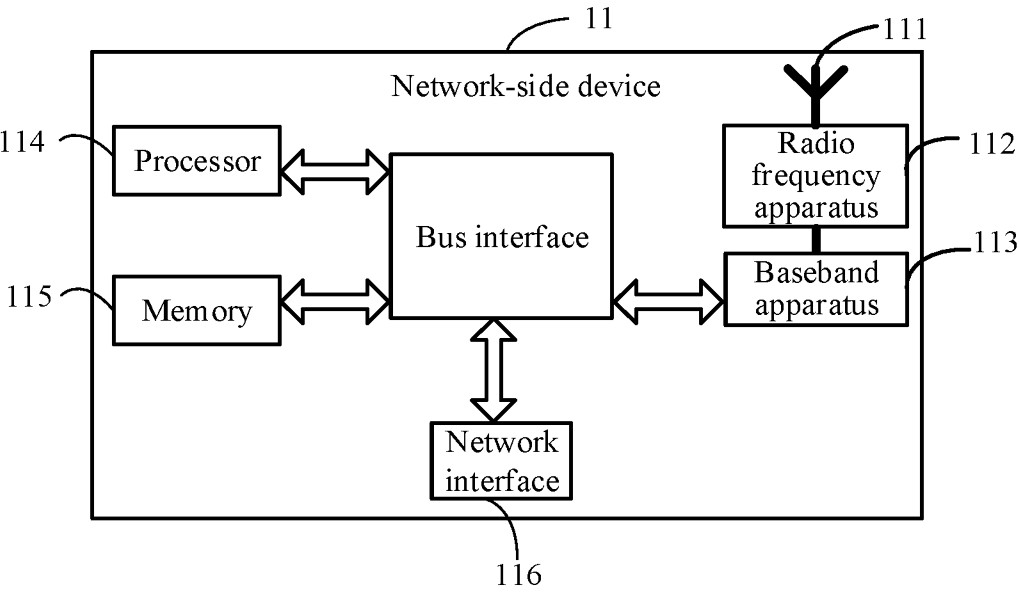
FIG. 11 is a schematic diagram of a hardware structure of a network-side device for implementing the embodiments of this application.

Specifically, an embodiment of this application further provides a network-side device. As shown in FIG. 11, the network-side device 11 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes to-be-sent information, and sends the information to the radio frequency apparatus 112; and the radio frequency apparatus 112 processes the received information and then sends the information out by using the antenna 111.

The frequency band processing apparatus may be located in the baseband apparatus 113. The method performed by the network-side device in the foregoing embodiments may be implemented in the baseband apparatus 113, and the baseband apparatus 113 includes a processor 114 and a memory 115.

The baseband apparatus 113 may include, for example, at least one baseband processing unit, where a plurality of chips are disposed on the baseband processing unit. As shown in FIG. 11, one of the chips is, for example, the processor 114, connected to the memory 115, to invoke a program in the memory 115 to perform the operation of the network-side device shown in the foregoing method embodiment.

The baseband apparatus 113 may further include a network interface 116, configured to exchange information with the radio frequency apparatus 112, where the interface is, for example, a common public radio interface (CPRI).

Specifically, the network-side device in this embodiment of this application further includes: instructions or a program stored in the memory 115 and capable of running on the processor 114. The processor 114 invokes the instructions or program in the memory 115 to execute the method executed by the modules shown in FIG. 6, with the same technical effects achieved. To avoid repetition, details are not repeated herein.

An embodiment of this application further provides a readable storage medium, where a program or instructions are stored in the readable storage medium. When the program or the instructions are executed by a processor, the processes of the foregoing embodiment of the time information sending method described above can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions of a network-side device to implement the processes of the foregoing embodiment of the time information sending method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a program product, where the program product is stored in a storage medium, and the program product is executed by a processor to implement the processes of the foregoing embodiment of the time information sending method described above, with the same technical effects achieved. To avoid repetition, details are not described herein again.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A time information sending method, being executed by a terminal and comprising:

in a case that a first condition is satisfied, sending first time information to a network side, to cause the network side to obtain a timing advance value of the terminal according to the first time information and fourth time information, wherein the fourth time information comprises a time offset for an uplink signal of the terminal, and the terminal has performed delay pre-compensation, wherein the first condition comprises at least one of the following:

period-based sending condition, request-based sending condition, and event-triggered sending condition.

2. The method according to claim 1, wherein the first time information comprises at least one of the following:

second time information, wherein the second time information comprises a delay of a service link and a delay of a feeder link;

a delay of the service link;

an offset value relative to third time information, wherein the third time information comprises a delay from a first network-side device to a reference point; and an offset value relative to the first time information that is latest sent, wherein the delay of the service link is determined based on positioning information and first information, wherein the positioning information comprises location information of the terminal, and the first information is related to a second network-side device.

3. The method according to claim 1, wherein the event-triggered sending condition comprises at least one of the following:

initial access being executed;

connection being resumed;

an offset value between a time in the first time information sent and a time in the first time information latest sent equaling or exceeding a first threshold;

uplink out-of-synchronization being determined;

cell handover having occurred;

a reference signal received power being less than a second threshold;

a reference signal received quality being less than a third threshold;

a path loss value being greater than a fourth threshold;

an offset value between the reference signal received power and a latest measured reference signal received power being greater than a fifth threshold;

an offset value between the reference signal received quality and a latest measured reference signal received quality being greater than a sixth threshold; and the path loss value and a latest measured path loss value being greater than a seventh threshold.

4. The method according to claim 1, wherein a format of the first time information comprises a quantized value length of the first time information, and the quantized value length is specified by a protocol or configured by the network side; and the quantized value length of the first time information is determined based on at least one of the following:

content of the first time information;

type of a second network-side device; and unit of the first time information.

5. The method according to claim 1, wherein before the step of sending first time information to a network side, the method further comprises:

receiving target information from the network side; wherein the target information comprises at least one of the following:

first information, wherein the first information is related to a second network-side device;

a delay of a feeder link;

third time information, wherein the third time information comprises a delay from a first network-side device to a reference point;

content of the first time information;

format of the first time information;

period information, used for the terminal periodically to send the first time information to the network side based on the period information;

a first indication, used for the terminal to send the first time information to the network side based on the first indication; and a first event, used for the terminal to send the first time information to the network side based on the first event, wherein the first indication comprises: a scheduling signaling indication and/or a radio resource control signaling indication.

6. The method according to claim 1, wherein the sending first time information to a network side comprises at least one of the following:

generating a media access control control element (MAC CE) through a media access control layer, and sending the MAC CE to the network side, wherein the MAC CE carries the first time information;

generating a radio resource control message through a radio resource control layer, and sending the radio resource control message to the network side, wherein the radio resource control message carries the first time information; and generating uplink control signaling through a physical layer, and sending the uplink control signaling to the network side, wherein the uplink control signaling carries the first time information.

7. The method according to claim 6, wherein the method further comprises:

using a reserved index value as a locale ID in the MAC CE, wherein the locale ID is used to indicate that the MAC CE carries the first time information.

8. The method according to claim 6, wherein a format and size of the MAC CE, the radio resource control message, and the uplink control signaling are determined by at least one of the following:

content of the first time information;

type of a second network-side device; and unit of the first time information.

9. The method according to claim 6, wherein a priority of the MAC CE satisfies at least one of the following:

being lower than a priority of a MAC CE carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a MAC CE carrying configured grant acknowledgement;

being higher than a priority of a MAC CE carrying a BFR; and being higher than a priority of a MAC CE carrying multi-access configured grant acknowledgement.

10. A time information sending method, being executed by a network side and comprising:

receiving first time information sent by a terminal; and obtaining, based on the first time information, a timing advance value of the terminal, comprising:

obtaining the timing advance value of the terminal based on the first time information and fourth time information, wherein the fourth time information includes a time offset for an uplink signal of the terminal, and the terminal has performed delay pre-compensation.

11. The method according to claim 10, wherein the first time information comprises at least one of the following:

second time information, wherein the second time information comprises a delay of a service link and a delay of a feeder link;

a delay of the service link;

an offset value relative to third time information, wherein the third time information comprises a delay from a first network-side device to a reference point; and an offset value relative to the first time information that is latest sent.

12. The method according to claim 10, wherein the receiving the first time information sent by the terminal comprises:

receiving the first time information sent by the terminal that meets at least one of the following conditions:

period-based sending condition, request-based sending condition, and event-triggered sending condition.

13. The method according to claim 12, wherein the event-triggered sending condition comprises at least one of the following:

initial access being executed;

connection being resumed;

an offset value between a time in the first time information sent and a time in the first time information latest sent equaling or exceeding a first threshold;

uplink out-of-synchronization being determined;

cell handover having occurred;

a reference signal received power being less than a second threshold;

a reference signal received quality being less than a third threshold;

a path loss value being greater than a fourth threshold;

an offset value between the reference signal received power and a latest measured reference signal received power being greater than a fifth threshold;

an offset value between the reference signal received quality and a latest measured reference signal received quality being greater than a sixth threshold; and the path loss value and a latest measured path loss value being greater than a seventh threshold.

14. The method according to claim 10, wherein a format of the first time information comprises a quantized value length of the first time information, and the quantized value length is specified by a protocol or configured by the network side; and the quantized value length of the first time information is determined based on at least one of the following:

content of the first time information;

type of a second network-side device; and unit of the first time information.

15. The method according to claim 10, wherein before the step of receiving first time information sent by a terminal, the method further comprises:

sending target information to the terminal; wherein the target information comprises at least one of the following:

first information, wherein the first information is related to a second network-side device;

a delay of a feeder link;

third time information, wherein the third time information comprises a delay from a first network-side device to a reference point;

content of the first time information;

format of the first time information;

period information, used for the terminal periodically to send the first time information to the network side based on the period information;

a first indication, used for the terminal to send the first time information to the network side based on the first indication; and a first event, used for the terminal to send the first time information to the network side based on the first event.

16. The method according to claim 10, wherein the receiving first time information sent by a terminal comprises at least one of the following:

receiving a media access control control element (MAC CE) sent by the terminal, wherein the MAC CE carries the first time information;

receiving a radio resource control message sent by the terminal, wherein the radio resource control message carries the first time information; and receiving uplink control signaling sent by the terminal, wherein the uplink control signaling carries the first time information.

17. The method according to claim 16, wherein a format and size of the MAC CE, the radio resource control message, and the uplink control signaling are determined by at least one of the following:

content of the first time information;

type of a second network-side device; and unit of the first time information.

18. The method according to claim 16, wherein a priority of the MAC CE satisfies at least one of the following:

being lower than a priority of a MAC CE carrying a cell radio network temporary identifier;

being lower than a priority of data from an uplink common control channel or C-RNTI MAC CE;

being lower than a priority of MAC CE for Timing Advance Report;

being higher than a priority of user plane data;

being higher than a priority of a MAC CE carrying configured grant acknowledgement;

being higher than a priority of a MAC CE carrying a BFR; and being higher than a priority of a MAC CE carrying multi-access configured grant acknowledgement.

19. The method according to claim 10, wherein the obtaining the timing advance value of the terminal based on the first time information and fourth time information comprises at least one of the following:

in a case that the first time information is second time information, the timing advance value of the terminal is the first time information, wherein the second time information comprises a delay of a service link and a delay of a feeder link;

in a case that the first time information is a delay of the service link, the timing advance value of the terminal is a sum of the first time information and the delay of the feeder link;

in a case that the first time information is an offset value relative to third time information, the timing advance value of the terminal is a sum of the first time information and the third time information, wherein the third time information comprises a delay from a first network-side device to a reference point;

in a case that the first time information is an offset value relative to latest sent first time information, the timing advance value of the terminal is a sum of the first time information and the first time information latest sent;

in a case that the first time information is second time information, the timing advance value of the terminal is a sum of the first time information and fourth time information;

in a case that the first time information is a delay of the service link, the timing advance value of the terminal is a sum of the first time information, the delay of the feeder link, and the fourth time information;

in a case that the first time information is an offset value relative to third time information, the timing advance value of the terminal is a sum of the first time information, the third time information, and the fourth time information; and in a case that the first time information is an offset value relative to latest sent time information, the timing advance value of the terminal is a sum of the first time information, latest sent time information, and the fourth time information.

* * * * *